United States Patent [19]

Meyer et al.

[11] 4,246,371

[45] Jan. 20, 1981

[54] POLYAMIDE BLENDS

[75] Inventors: Rolf V. Meyer; Peter Tacke, both of Krefeld, Fed. Rep. of Germany

[73] Assignee: Bayer Aktiengesellschaft, Fed. Rep. of Germany

[21] Appl. No.: 3,010

[22] Filed: Jan. 12, 1979

Related U.S. Application Data

[63] Continuation of Ser. No. 855,372, Nov. 28, 1977, abandoned.

[30] Foreign Application Priority Data

Nov. 30, 1976 [DE] Fed. Rep. of Germany ........ 2654168
Mar. 26, 1977 [DE] Fed. Rep. of Germany ........ 2713537

[51] Int. Cl.$^2$ ............................................. C08L 77/00
[52] U.S. Cl. ..................................... 525/183; 525/919
[58] Field of Search ..................... 260/857 L; 525/183

[56] References Cited

U.S. PATENT DOCUMENTS

| | | | |
|---|---|---|---|
| 3,264,272 | 8/1966 | Rees | 260/875 |
| 3,375,219 | 3/1968 | Robb | 260/857 L |
| 3,472,916 | 10/1969 | Anspon | 260/857 L |
| 3,845,163 | 10/1974 | Murch | 260/857 L |
| 4,105,709 | 8/1978 | Iwami | 260/857 L |

FOREIGN PATENT DOCUMENTS

| | | | |
|---|---|---|---|
| 674595 | 11/1963 | Canada . | |
| 740501 | 8/1966 | Canada | 260/857 L |
| 48-1438 | 1/1973 | Japan | 260/857 L |

*Primary Examiner*—Paul Lieberman
*Attorney, Agent, or Firm*—Connolly and Hutz

[57] ABSTRACT

Polymer blends with high notched impact strength comprising polyamide-6 with a relative viscosity of at least 3,5 and copolymers of ethylene, (meth)acrylic acid and esters of (meth)acrylic acid.

7 Claims, No Drawings

POLYAMIDE BLENDS

CROSS REFERENCE TO RELATED APPLICATION

This application is a continuation of application Ser. No. 855,372, filed Nov. 28, 1977 and now abandoned.

The present invention relates to polymer mixtures based on polyamide-6 which combine high toughness with excellent homogeneity.

The mechanical properties of polymers usually depend upon their pretreatment. Thus, for example, the impact strength of mouldings of polyamide plastics is governed to a large extent by the water content of the mouldings.

In particular, mouldings produced from free-flowing, preferably highly crystalline polyamides of average molecular weight are relatively sensitive in anhydrous form to impact stressing. Accordingly, there is a need for rapidly processible, free-flowing polyamide plastics from which it is possible to produce, in particular, mouldings which show increased impact strength in their dry state. Polyamides of particular interest are those which combine the characteristics of high tensile strength, high thermal stability under load, high resistance to solvents and ready processibility with high impact strength and flexibility.

There are already various methods of increasing the toughness and flexibility of polyamides. According to one known method, for example, low molecular weight plasticizers are mixed into polyamides. But most of the plasticisers suitable for plastics are not sufficiently compatible with polyamides and they separate out during processing or tend to exude. However, compatible plasticisers which form true solutions with polyamides generally have an adverse effect upon the favourable mechanical properties of the polyamides. Although strongly polar substances of low molecular weight, such as water or dimethyl formamide, have a strong plasticising effect, they can only be worked into the polyamide mouldings after the mouldings have actually been produced because otherwise bubble-containing mouldings would be formed during processing of the pretreated polyamide granulate on account of the relatively low boiling points of these plasticisers.

In addition, this process is generally time consuming and expensive. Furthermore, it is unsuitable for the production of thick-walled mouldings on account of the irregular distribution of the plasticiser in the moulding. Moreover, these plasticisers partially escape from the polyamide again on account of their relatively high vapour pressure.

In particular these measures have proved to be unsuitable for processing the thus pretreated polyamide granulate into high-quality films.

Attempts have also been made to improve the impact strength of polyamides by the incorporation of polymeric substances, such as polyethylene and copolymers of vinylacetate and ethylene (German Auslegeschrift No. 1,138,922=British Patent No. 919,098). Although the production of such mixtures necessitates extremely intensive kneading, disintegration occurs during further processing, for example, by injection moulding and, particularly, in the manufacture of films.

Accordingly, mouldings produced therefrom show a tendency towards white fracture. In the manufacture of films, rapid disintegration occurs immediately after emergence from the die, even in cases where high working pressures are applied.

The flexibility of polyamides can also be increased by mixing them with polyethylenes containing acidic groups, for example copolymers of ethylene and unsaturated acids or polyethylene grafted with unsaturated acids. Although such mixtures are more finely disperse and, under stressing, show a much lower tendency towards white fracture than the mixtures described above, their somewhat improved toughness and flexibility is offset by considerably poorer mechanical properties such as, E-modulus, tensile strength, hardness and rigidity, than that of polyamides.

Copolymers of ethylene and acrylic or methacrylic acid have also been used in attempts to increase the flexibility of polyamides in their freshly injection-moulded state.

Thus, according to the teaching of U.S. Pat. No. 3,472,916 and German Pat. No. 1,669,702, a certain improvement is obtained by using copolymers of ethylene and acrylic or methacrylic acid esters. But their notched impact strength immediately after injection-moulding is still unsatisfactory, as well as their significant tendency towards disintegration. These disadvantages also show the blends known from U.S. Pat. No. 3,845,163 and French Pat. No. 1,504,113. Additionally on account of the methacrylic acid being partly present in salt form, the tracking resistance is known to deteriorate to such a considerable extent that the products cannot be effectively used in the electrical field. In addition, most of the metal ions used for neutralisation, for example $Zn^{2+}$, $Ba^{2+}$, $Cd^{2+}$ and $Hg^{2+}$, are physiologically incompatible. Thus, such products cannot be used either in the food-packaging field or in children's toys.

Finally, copolymers of ethylene, acrylic or methacrylic acid and acrylates or methacrylates have also been added as elasticising component to polyamides (DAS No. 1,241,606=British Pat. No. 998,439) whereby an improvement in impact strength is obtained. However, products of sufficient high impact strength are not described there either.

However, polyamide blends showing sufficient high impact strength in freshly injection-moulded form, coupled with extremely high homogeneity and the absence of any tendency towards disintegration, are surprisingly obtained by using polyamide-6 with a certain minimum relative viscosity and ternary copolymers of ethylene, acrylic or methacrylic acid and a derivative of acrylic or methacrylic acid having a certain melt index.

Accordingly, the present invention relates to thermoplastic moulding compositions of high impact strength and consisting of 1. 70 to 96% by weight, preferably 80 to 92% by weight of a polyamide-6 having a relative viscosity of at least 3.5, preferably 3.7 to 4.5;
2. 4 to 30% by weight, preferably 8 to 20% by weight, of an at least ternary copolymer of:
   (a) 50 to 95% by weight, preferably 80 to 95% by weight of ethylene:
   (b) 1 to 20% by weight, preferably 1 to 10% by weight, of acrylic or methacrylic acid which may be completely or partly present in the form of its salt;
   (c) 1 to 30% by weight, preferably 1 to 20% by weight, of at least one ester of acrylic or methacrylic acid with $C_1$–$C_9$ alcohols and having a melt index (MI) of 2 to 15 g/10 min., preferably 5 to 10 g/10 min., the sum total of components 1+2 respectively a-c amounting to 100% by weight.

The relative viscosity of the polyamide-6 used is measured on a 1% solution in m-cresol at 25° C. Na-, K-, Zn- or Ca-salts can be used as the salts of acrylic or methacrylic acid. Esters with $C_1$-$C_9$-alcohols preferably $C_2$-$C_6$ alcohols may be used as the esters of acrylic or methacrylic acid. Most preferably acrylic or methacrylic acid ethyl, tert.-butyl or n-butyl ester is used.

Surprisingly the compatibility of the inventive blends is so high that they can be processed by standard methods into homogeneous films which are even transparent in the most common layer thicknesses of from 10 to 70 μm.

Polyamide-6 is advantageously used without any additives, for example, lubricants, such as calcium stearate or ethoxylated long-chain amines and/or crystallisation promoters, for example talcum.

The polymer components are mixed preferably above the melting point of the polyamide used, advantageously at temperatures in the range from 200° C. to 320° C. and, more especially, at temperatures of from 260° C. to 290° C.

Machines in which the moulding compositions according to the invention may be produced are standard screw machines. It is possible to use both machines comprising a single screw and also machines comprising double screws. Twin-screw extruders are preferably used.

However, it is also possible to use other mixing machines which are suitable for plasticising plastics.

In addition, stabilisers, mould-release agents, lubricants, crystallisation accelerators, plasticisers, pigments, dyes or fillers, such as glass fibres or asbestos, may also be incorporated in the highly elastic blends in case they are used as thermoplastic moulding compositions. Monofils and other shaped articles produced of the inventive blends do not show any white fracture at breaks and cuts, nor any signs of disintegration. In addition, they also show surfaces of extremely good quality in comparison with shaped articles of known polyamide/polyolefin mixtures. They also have a reduced water absorption capacity and solubility or swellability in conventional solvents and show greatly increased notched impact strength in their dry state in comparison with shaped articles of polyamides alone. The compositions are suitable for extrusion and injection moulding for the production of shaped articles such as housings, sheets, filaments, tapes, tubes and, in particular, homogeneous, transparent films and foils.

EXAMPLE 1

90 parts by weight of a polyamide-6 having a relative viscosity of 3.9, as measured on a 1% solution in m-cresol at 25° C. in an Ubbelohde viscosimeter, and a notched impact strength according to DIN 53453 of 4 kJ/m$^2$, and 10 parts by weight of a copolymer of ethylene, acrylic acid and ethylacrylate (ratio by weight 84:4:12) having a melt index of 7 g/10 min. were mixed for 5 minutes in a mixer. The mixture thus prepared was kneaded and extruded in a twin-screw extruder of the ZSK 53 type at 90 rpm/270° C., the melt was spun off into a water bath, granulated and then dried in vacuo at 80° C. to a water content of less than 0.05% by weight.

Freshly injected test specimens are found to show good homogeneity by alternating bending tests and have a notched impact strength according to DIN 53453 of 22 kJ/m$^2$.

EXAMPLES 2 TO 3

Further tests carried out in the same way as Example 1 are summarised in Table 1 below. The quantity in which the ethylene/acrylic acid/acrylic ester terpolymer described in Example 1 was used amounted to 10 parts by weight in each case. The measured notched impact strength values according DIN 53453 are set out in Table 1.

EXAMPLES 4 TO 6

Following the procedure of Example 1, the quantities indicated in Table 2 of a polyamide-6 having a relative viscosity of 3.9 were mixed with various quantities of the terpolymer described in Example 1. The notched impact strength and the homogeneity were determined as described in Example 1.

EXAMPLES 7 TO 10

The quantities indicated in Table 3 of a polyamide-6 having a relative viscosity of 3,94 and a notched impact strength of 3,8 kg/m$^2$ (DIN 53 453) were mixed and kneaded with various quantities of a copolymer of ethylene, acrylic acid and tert.-butyl acrylate (ratio by weight 89:4:12) having a melt index of 6,5 g/10 min. in a twin-screw extruder of the ZSK 53 type at 120 rpm at 270° C. The mixtures were worked up as described in Example 1. The notched impact strength and the homogeneity of the test samples are set forth in Table 3.

| Example No. | PA-6 % by weight | (ηrel) | Terpolymer % by weight | Notched impact strength [kJ/m$^2$] | Homogeneity |
|---|---|---|---|---|---|
| Table 1: | | | | | |
| 2 | 90 | (3.5) | 10 | 17.3 | very good |
| 3 | 90 | (4.4) | 10 | 26.0 | very good |
| Table 2: | | | | | |
| 4 | 94 | (3.9) | 6 | 17.8 | very good |
| 5 | 85 | (3.9) | 15 | 38.3 | very good |
| 6 | 80 | (3.9) | 20 | 55.7 | very good |
| Table 3: | | | | | |
| 7 | 95 | (3,94) | 5 | 12.7 | very good |
| 8 | 90 | (3.94) | 10 | 23 | very good |
| 9 | 85 | (3.94) | 15 | 40,5 | very good |
| 10 | 80 | (3.94) | 20 | 59,2 | very good |

We claim:
1. A thermoplastic moulding composition with high notched impact strength consisting essentially of
   (1) 80 to 92% by weight of a polyamide-6 having a relative viscosity of at least 3.5 as measured in a 1% solution in m-cresol at 25° C.; and
   (2) 8 to 20% by weight of an at least one ternary copolymer consisting of
      (a) 80 to 95% by weight of ethylene;
      (b) 1 to 10% by weight of acrylic or methacrylic acid; and
      (c) 1 to 20% by weight of at least one ester of acrylic or methacrylic acid with a $C_2$-$C_6$ alcohol and having a melt index of 2 to 15 g/10 min.
2. A composition, as claimed in claim 1, wherein component (1) has a relative viscosity of from 3.7 to 4.5.
3. A composition, as claimed in claim 1, which consists of from 80 to 92% by weight of component (1).
4. A composition, as claimed in claim 1, wherein component (2) has a melt index of 5 to 10 g/10 min.
5. A composition, as claimed in claim 1, wherein the ester of component (2c) is an ethyl, n-butyl or tert.-butyl acrylate.
6. A shaped article produced of a thermoplastic moulding composition, as claimed in claim 1.
7. A film produced of a thermoplastic moulding composition, as claimed in claim 1.

* * * * *